(12) United States Patent
Piard et al.

(10) Patent No.: US 12,139,267 B2
(45) Date of Patent: Nov. 12, 2024

(54) ASSEMBLY FOR AN AIRCRAFT NACELLE AND COMPRISING A SUPPORT PANEL, A THERMAL PROTECTION ELEMENT AND A FASTENING SYSTEM

(71) Applicant: Airbus Operations SAS, Toulouse (FR)

(72) Inventors: Frédéric Piard, Toulouse (FR); Lionel Czapla, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 258 days.

(21) Appl. No.: 17/939,000

(22) Filed: Sep. 7, 2022

(65) Prior Publication Data
US 2023/0084689 A1    Mar. 16, 2023

(30) Foreign Application Priority Data

Sep. 10, 2021 (FR) ...................................... 2109535

(51) Int. Cl.
| | |
|---|---|
| B64D 29/06 | (2006.01) |
| F01D 25/24 | (2006.01) |
| F16L 59/12 | (2006.01) |

(52) U.S. Cl.
CPC .............. B64D 29/06 (2013.01); F16L 59/12 (2013.01)

(58) Field of Classification Search
CPC ..... F01D 25/243; F01D 25/246; B64D 29/06; F16L 59/12; F05D 2260/30
See application file for complete search history.

(56) References Cited

U.S. PATENT DOCUMENTS

| | | | | |
|---|---|---|---|---|
| 3,052,940 A | * | 9/1962 | Sellers | F16B 21/165 411/348 |
| 4,016,914 A | * | 4/1977 | Zurko | F16B 21/165 411/105 |
| 5,061,112 A | * | 10/1991 | Monford, Jr. | F16B 21/183 403/DIG. 1 |
| 2014/0255182 A1 | * | 9/2014 | Ruberte Sanchez | F02K 1/827 415/213.1 |
| 2015/0232190 A1 | * | 8/2015 | Provost | F16B 5/0642 244/54 |

FOREIGN PATENT DOCUMENTS

WO    2015155477 A1    10/2015

OTHER PUBLICATIONS

French Search Report; priority document.

* cited by examiner

*Primary Examiner* — Andrew H Nguyen
(74) *Attorney, Agent, or Firm* — Greer, Burns & Crain, Ltd.

(57) ABSTRACT

An assembly including a support panel of an internal fixed structure, a thermal protection element and a plurality of fastening systems. Each fastening system includes a female part secured to the support panel and which has, in its interior, a circular shoulder, and a male part including a sleeve pierced with a main bore, a slide movable in translation in the main bore and a plurality of balls. For each ball, the sleeve has a secondary bore, and each ball is movable along the secondary bore between a locking position and an unlocking position. The slide is movable in translation between a blocking position and an unlocking position. Such an assembly makes it possible to fasten the thermal protection element to the support panel in a simple and rapid manner, also permitting easy removal if necessary.

10 Claims, 5 Drawing Sheets

ASSEMBLY FOR AN AIRCRAFT NACELLE AND COMPRISING A SUPPORT PANEL, A THERMAL PROTECTION ELEMENT AND A FASTENING SYSTEM

CROSS-REFERENCES TO RELATED APPLICATIONS

This application claims the benefit of the French patent application No. 2109535 filed on Sep. 10, 2021, the entire disclosures of which are incorporated herein by way of reference.

FIELD OF THE INVENTION

The present invention relates to an assembly for a nacelle of an aircraft engine, comprising a support panel, a thermal protection element and a fastening system which fastens the thermal protection element to the support panel, to a nacelle of an aircraft engine comprising at least one such assembly, and to an aircraft comprising at least one such nacelle.

BACKGROUND OF THE INVENTION

An aircraft conventionally comprises at least one turbofan which has an engine constituting a core accommodated in a nacelle. The nacelle comprises an internal fixed structure (IFS) surrounding the engine, and outer cowls which are disposed around the internal fixed structure.

The internal structure and the outer cowls delimit between them a secondary duct in which a secondary air flow coming from an air inlet disposed at the front of the nacelle circulates, whereas a primary flow circulates in the engine.

The internal structure is subjected to very high temperatures due to the proximity of the engine and it is therefore desirable to fasten thermal protection elements there.

SUMMARY OF THE INVENTION

An object of the present invention is to propose an assembly for a nacelle of an aircraft engine, comprising a support panel such as a panel of an internal structure, a thermal protection element and a fastening system which fastens the thermal protection element to the support panel, wherein the fastening is effected in a simple and rapid manner.

To that end, an assembly is proposed, comprising:
  a support panel of an internal fixed structure of a nacelle of a turbofan,
  a thermal protection element in contact with the support panel at a contact surface, and
  a plurality of fastening systems which removably fasten the thermal protection element to the support panel,
  wherein, for each fastening system, the thermal protection element has a hole passing through it,
  wherein each fastening system comprises:
  a female part accommodated in the corresponding hole, and having a base secured to the support panel and a cylindrical wall delimiting a free and open space in the direction away from the support panel, wherein the cylindrical wall has a circular shoulder which protrudes towards the interior of the cylindrical wall, and
  a male part comprising a sleeve inserted in the cylindrical wall and pierced with a main bore, a slide movable in translation in the main bore and a plurality of balls, wherein, for each ball, the sleeve has a secondary bore which is perpendicular to the main bore and which leads, on a first side, into the main bore and, on a second side, to the exterior of the sleeve, wherein each ball is placed in the corresponding secondary bore and is movable in translation along the secondary bore between a locking position, in which the ball projects on the second side, and an unlocking position, in which the ball does not project on the second side, wherein, for each ball, the slide comprises a cavity in the shape of a half-ball, and wherein the slide is movable in translation between a blocking position, in which the slide is in a position such that the cavities are not opposite the balls and such that the balls are forced into the locking position, and an unblocking position, in which the slide is in a position such that the cavities are opposite the balls allowing the balls to pass into the unlocking position and wherein the male part comprises a cap which is secured to the sleeve and which bears against the face of the thermal protection element on the side opposite to the contact surface.

Such an assembly makes it possible to fasten the thermal protection element to the support panel in a simple and rapid manner, also permitting easy removal if necessary.

Advantageously, the passage from the blocking position to the unblocking position of the slide comprises pressing down the slide in the sleeve, the slide bears a stop and the sleeve has a chamber in which the stop moves and a face of which constitutes a counter-stop against which the stop bears in the blocking position, and the slide has, in the blocking position, an end which goes beyond the cap and which is passed through by an orifice in which a locking means is inserted.

According to a particular embodiment, for each female part, the assembly comprises a cylindrical washer which fits tightly on the female part so as to fill the space between the support panel and the thermal protection element at the hole.

According to a particular embodiment, for each female part, the assembly comprises a grommet which is positioned along the edges of the corresponding hole of the thermal protection element, which fits tightly on the corresponding cylindrical wall, and which bears against the base.

According to a particular embodiment, each male part is secured to the thermal protection element.

According to a particular embodiment, for each female part, the assembly comprises a cylindrical washer which fits tightly on the female part so as to fill the space between the support panel and the thermal protection element at the hole, the thermal protection element comprises, on its face oriented against the cap, a supporting plate adhesively bonded to the face, and the cap is fastened to the grommet and to the supporting plate.

According to a particular embodiment, the thermal protection element comprises, on its face oriented against the cap, a supporting plate adhesively bonded to the face, and the cap is fastened to the supporting plate.

Advantageously, the male part comprises a return means which urges the slide into the locking position.

The invention also proposes a nacelle of a turbofan, the nacelle comprising an internal fixed structure and an assembly according to one of the preceding variants, wherein the support panel is a panel of the internal fixed structure.

The invention also proposes an aircraft comprising at least one nacelle according to the preceding variant.

BRIEF DESCRIPTION OF THE DRAWINGS

The above-mentioned features of the invention, together with others, will become more clearly apparent upon reading the following description of an exemplary embodiment, the description being given with reference to the appended drawings, in which.

DETAILED DESCRIPTION OF THE PREFERRED EMBODIMENTS

In the following description, terms relating to a position are considered with reference to the direction of forward travel of an aircraft, indicated by the arrow 107 in FIG. 1.

Figure 1:
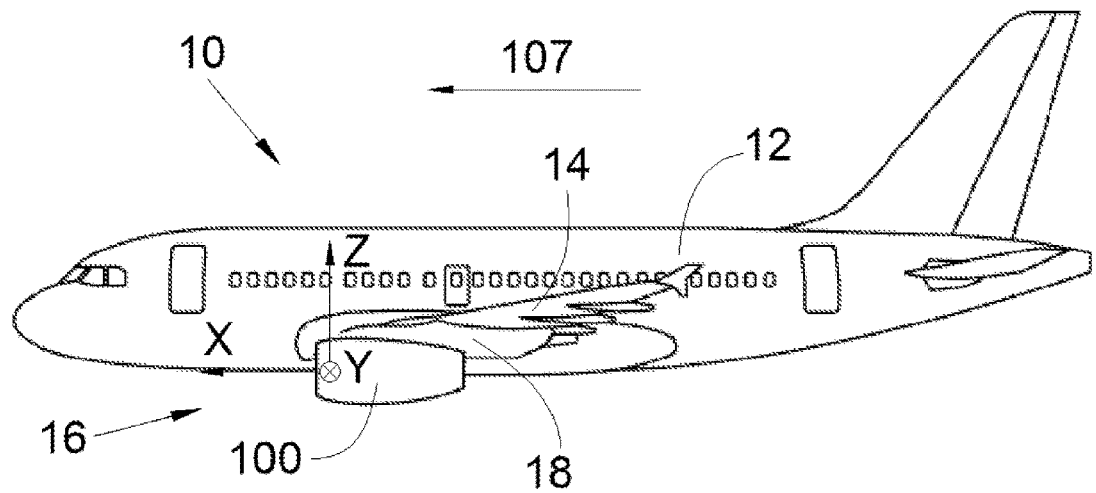
FIG. 1 is a side view of an aircraft according to the invention.

FIG. 1 shows an aircraft 10 which has a fuselage 12, to each side of which is fastened a wing 14 which bears at least one turbofan 16 supported by a pylon 18 which fastens the turbofan 16 beneath the wing 14.

In the following description, and by convention, X denotes the longitudinal axis of the turbofan 16 which is parallel to the longitudinal axis of the aircraft 10 and is oriented positively towards the front of the aircraft 10, Y denotes the transverse axis which is horizontal when the aircraft 10 is on the ground, and Z denotes the vertical axis when the aircraft 10 is on the ground, these three axes X, Y and Z being mutually orthogonal.

The turbofan 16 comprises a nacelle 100 and an engine forming a core which is accommodated inside the nacelle 100 which conventionally comprises two modules which are fastened to the pylon 18 on either side of a vertical median plane XZ.

Figure 2:
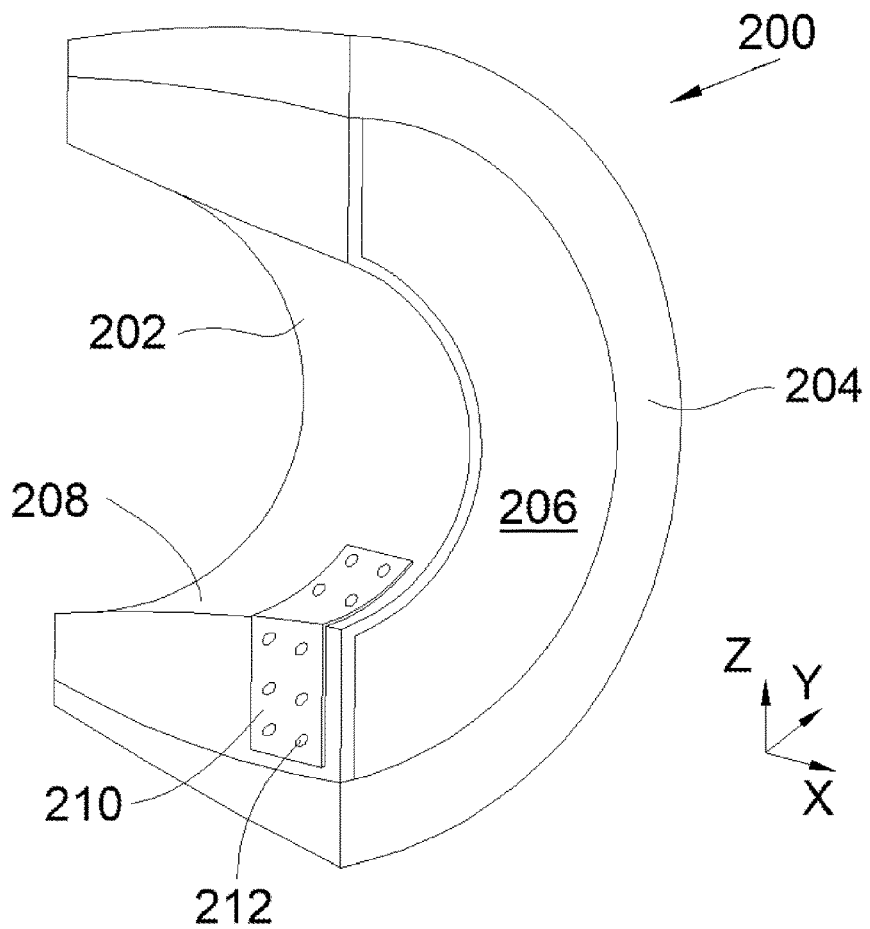
FIG. 2 is a perspective view of a portion of a nacelle according to the invention.

FIG. 2 schematically shows a module 200 of the nacelle 100. The module 200 comprises, inter alia, an internal fixed structure 202 (IFS) surrounding the engine, and outer cowls 204 which are disposed around the internal fixed structure The internal structure 202 and the outer cowls 204 delimit between them a secondary duct 206 in which a secondary air flow coming from an air inlet disposed at the front of the nacelle 100 circulates.

The internal structure 202 comprises, inter alia, a support panel 208 which surrounds the engine and which is subjected to high temperatures. In the context of the invention, the support panel 208 is protected by thermal protection elements 210.

In the embodiment of the invention presented here, a single thermal protection element 210 is shown, but a plurality of such thermal protection elements 210 are fastened so as to cover the surface of the support panel 208 to be protected.

Each thermal protection element 210 takes the form of an additional panel which is fastened to the support panel 208 by way of a plurality of fastening systems 212 and which is made of a thermally insulating material.

Figure 3:
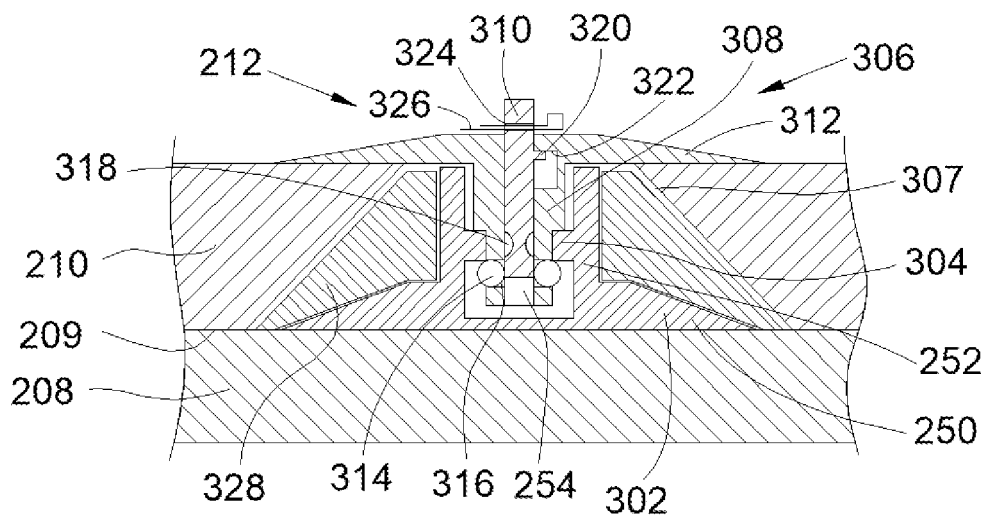
FIG. 3 is a view in section of an assembly according to a first embodiment of the invention in an assembled position.
Figure 4:
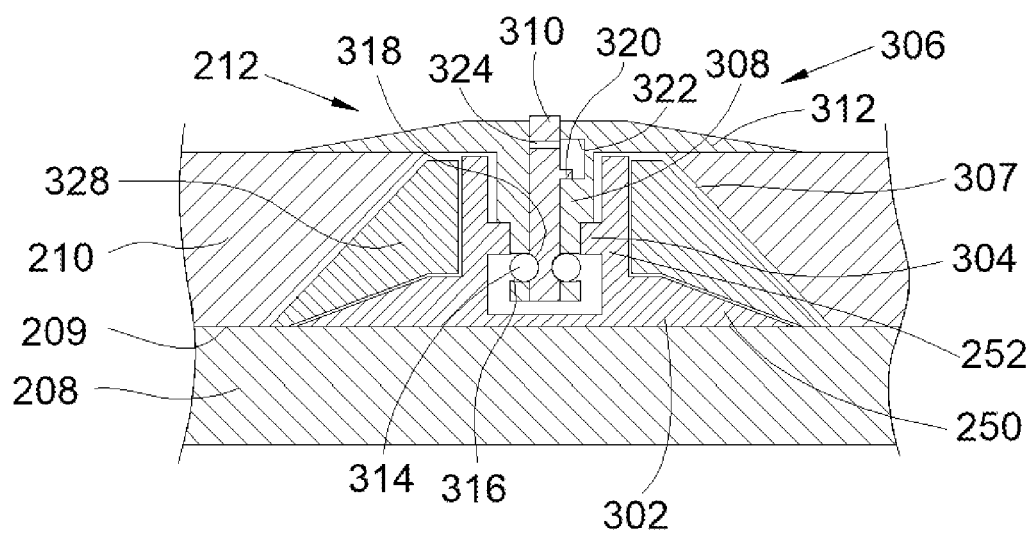
FIG. 4 is a view similar to that of FIG. 3, in an unlocked position.
Figure 5:
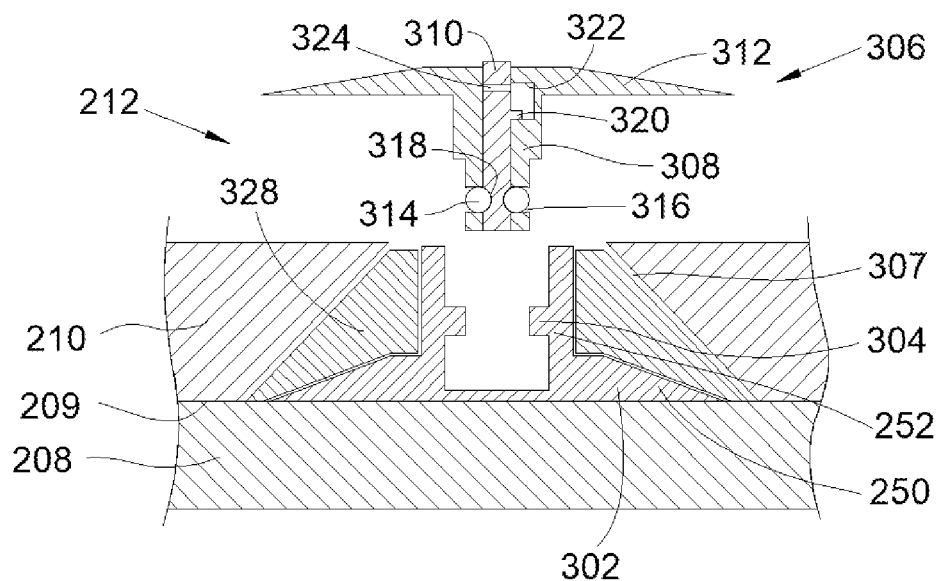
FIG. 5 is a view similar to that of FIG. 3, in a disassembled position.

FIGS. 3 to 5 show a first embodiment of the invention in various assembly positions. The thermal protection element 210 and the support panel 208 are in contact with one another at a contact surface 209.

The fastening system 212 comprises a female part 302 which, in this case, is a part exhibiting symmetry of revolution about an axis of revolution perpendicular overall to the support panel 208, and which has a cylindrical wall 252 delimiting a free space and a base 250 secured to the support panel 208 and to the cylindrical wall 252. The cylindrical wall 252 exhibits symmetry of revolution about the axis of revolution and has an opening oriented in the direction away from the support panel 208. The cylindrical wall 252 has, in its interior, a circular shoulder 304 about the axis of revolution which protrudes towards the interior of the cylindrical wall 252.

As will be explained below, the shoulder 304 is provided so as to allow the balls to be placed at the back of the shoulder 304 with respect to the opening. The shoulder 304 is therefore at a distance from the bottom of the female part 302, corresponding to the base 250.

In order to allow each female part 302 to be put in place, the thermal protection element 210 has a hole 307 passing through it parallel to the axis of revolution.

The fastening system 212 comprises a male part 306 which, in this case, also exhibits symmetry of revolution about the axis of revolution.

The male part 306 comprises a sleeve 308 which is inserted in the female part 302, and more specifically in the free space delimited by the cylindrical wall 252 so as to fasten the thermal protection element 210 to the support panel 208. The sleeve 308 is pierced with a main bore 254 that is coaxial with the axis of revolution, and the male part 306 comprises a slide 310 movable in translation in the main bore 254. The male part 306 also comprises a cap 312 which is secured to the sleeve 308 and which bears against the face of the thermal protection element 210 on the side opposite to the contact surface 209.

The male part 306 also comprises a plurality of balls 314 which are angularly distributed about the axis of revolution.

For each ball 314, the sleeve 308 has a secondary bore 316 which is perpendicular to the main bore 254 and which leads, on a first side, into the main bore 254 and, on a second side, to the exterior of the sleeve 308. Each ball 314 is placed in the corresponding secondary bore 316 and is thus movable in translation along the secondary bore 316 between a locking position (FIG. 3), in which the ball 314 projects on the second side and therefore protrudes with respect to the sleeve 308, and an unlocking position (FIGS. 4 and 5), in which the ball 314 does not project on the second side and is therefore retracted inside the sleeve 308.

In order to prevent the loss of the ball 314 on the second side, the diameter of the secondary bore 316 on the second side is smaller than the diameter of the ball 314 while still ensuring that a portion of the ball 314 can exit the sleeve 308.

For each ball 314, the slide 310 comprises a cavity 318 in the form of a half-ball which is recessed into the slide 310.

The slide 310 is movable in translation between a blocking position and an unblocking position. In the blocking position (FIG. 3), the slide 310 is in a position such that the cavities 318 are not opposite the balls 314. The balls 314 are then against the slide 310, thus forcing the balls 314 into the locking position, and in the unblocking position (FIGS. 4 and 5), the slide 310 is in a position such that the cavities 318 are opposite the balls 314 allowing the balls 314 to pass into the unlocking position.

The principle of putting the fastening system 212 in place comprises placing the thermal protection element 210 against the support panel 208 with the female part 302 in the hole 307.

The male part 306 is moved towards the female part 302 with the slide 310 in the unblocking position and the balls 314 in the unlocking position (FIG. 5). The sleeve 308 is introduced through the opening in the cylindrical wall 252 until the balls 314 are below the shoulder 304 (FIG. 4), and finally the slide 310 is moved into the blocking position (FIG. 3) so as to force the balls 314 into the locking position below the shoulder 304 so as to prevent the male part 306 from moving.

The passage from the unblocking position to the blocking position is effected in this case by withdrawing the slide 310 to a limited extent on the side of the cap 312.

At the same time, the cap 312 bears against the face of the thermal protection element 210 on the side opposite to the contact surface 209, thus fastening the thermal protection element 210 to the support panel 208 by sandwiching the thermal protection element 210 between the cap 312 and the support panel 208.

Conversely, the removal comprises starting from the locking and blocking position (FIG. 5), in moving (in this case pressing down) the slide 310 to the unblocking position (FIG. 4), thus releasing the balls 314 which are free to pass into the unlocking position, and then in withdrawing the male part 306 (FIG. 5) by pulling on the male part 306.

The installation and the removal of the thermal protection element are therefore relatively simple and rapid.

The assembly according to the invention constituting a portion of the nacelle 100 then comprises the support panel 208, the thermal protection element 210 and the plurality of fastening systems 212.

In the embodiment of FIGS. 3 to 5, the passage from the blocking position to the unblocking position of the slide 310 comprises pressing down the slide 310 in the sleeve 308, and, conversely, the passage from the unblocking position to the blocking position of the slide 310 comprises the slide 310 exiting the sleeve 308 at the cap 312.

In order to prevent the slide 310 from exiting beyond the blocking position, the slide 310 bears a stop 320 and the sleeve 308 has a chamber in which the stop 320 moves and a face of which constitutes a counter-stop 322 against which the stop 320 bears in the blocking position.

In order to prevent undesired pressing down of the slide 310, the slide 310 has, in the blocking position, an end which goes beyond the cap 312 and which is passed through by an orifice 324 in which a locking means 326, such as a pin, is inserted. The passage to the unblocking position then requires the prior withdrawal of the locking means 326.

In the embodiment of FIGS. 3 to 5, the assembly also comprises a cylindrical washer 328 with a central hole for permitting the tight fit on the female part 302, and more particularly, on the cylindrical wall 252, so as to fill the space between the support panel 208 and the thermal protection element 210 at the hole 307. The washer 328 is made of a thermally insulating material. In this case, the washer 328 takes the form of a truncated cone with a central hole.

Figure 6:
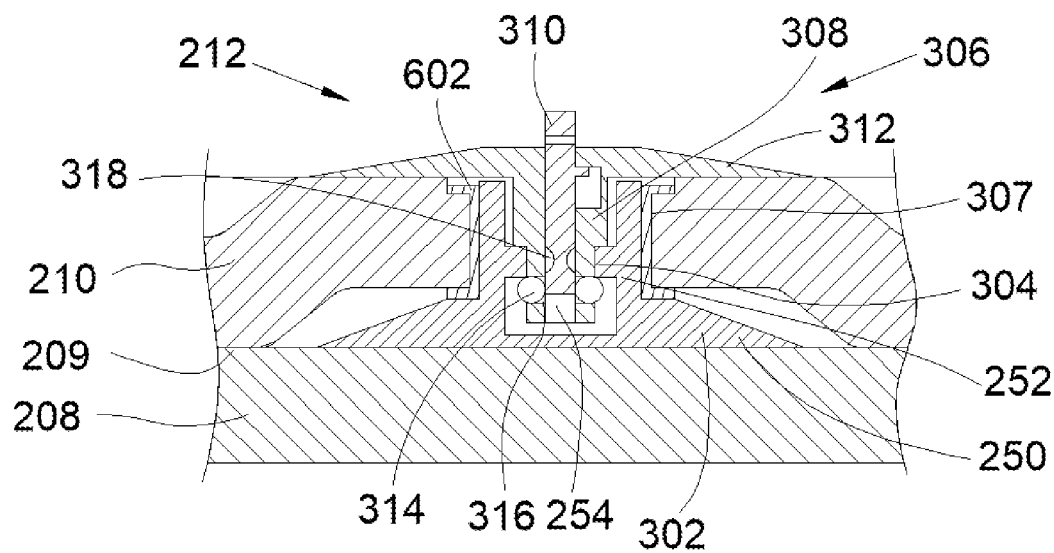
FIG. 6 is a view similar to that of FIG. 3 for a second embodiment of the invention.

In the second embodiment of the invention shown in FIG. 6, for each female part 302, the assembly comprises a grommet 602 which is positioned along the edges of the corresponding hole 307 of the thermal protection element 210. This grommet 602 fits tightly on the corresponding cylindrical wall 252 and bears against the base 250. The grommet 602 comprises two flanges which are disposed on either side of the thermal protection element 210, and a barrel which securely connects the two flanges.

Figure 7:
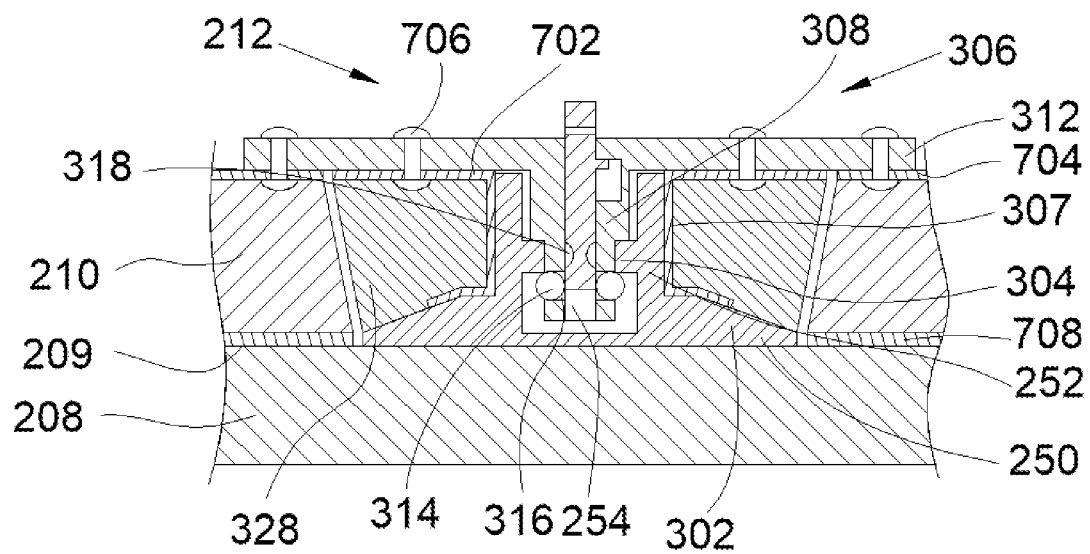
FIG. 7 is a view similar to that of FIG. 3 for a third embodiment of the invention.
Figure 8:
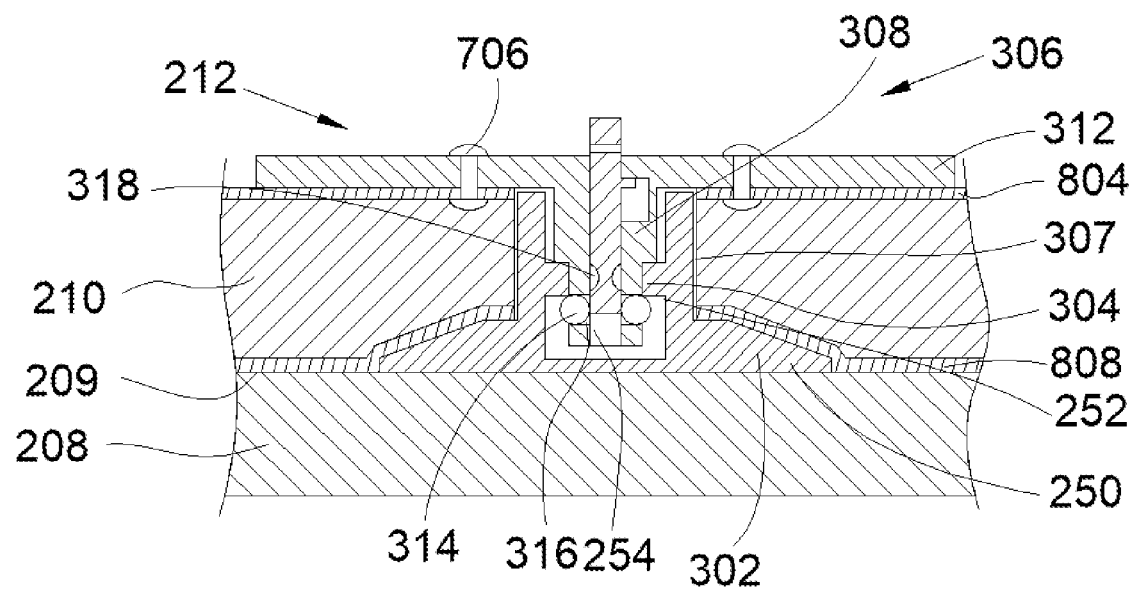
FIG. 8 is a view similar to that of FIG. 3 for a fourth embodiment of the invention.

In the third embodiment of the invention shown in FIG. 7 and in the fourth embodiment of the invention shown in FIG. 8, each male part 306 is secured to the thermal protection element 210. In this case, the secure attachment is realized by rivets 706.

In the third embodiment of the invention shown in FIG. 7, for each female part 302, the assembly comprises a grommet 702 which is positioned along the edges of the corresponding central hole of the washer 328. As above, this grommet 702 fits tightly on the corresponding cylindrical wall 252 and bears against the base 250.

Furthermore, the thermal protection element 210 comprises, on its face oriented against the cap 312, a supporting plate 704, of the metal plate type, adhesively bonded to the face.

The cap 312 is fastened to the grommet 702 and to the supporting plate 704.

In the embodiment of the invention presented here, the thermal protection element 210 comprises, on its face oriented against the support panel 208, another supporting plate 708, of the metal plate type, adhesively bonded to the face.

In the fourth embodiment of the invention shown in FIG. 8, the thermal protection element 210 comprises, on its face oriented against the cap 312, a supporting plate 804, of the metal plate type, adhesively bonded to the face, and the cap 312 is fastened to the supporting plate 804.

In the embodiment of the invention presented here, the thermal protection element 210 comprises, on its face oriented against the support panel 208, another supporting plate 808, of the metal plate type, adhesively bonded to the face.

Figure 9:
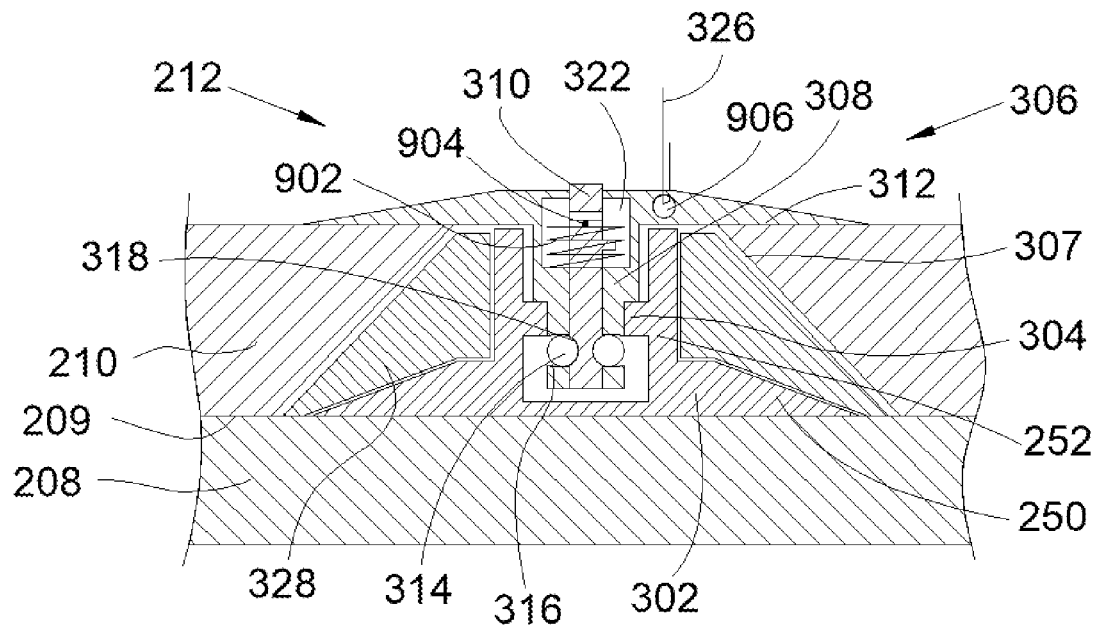
FIG. 9 is a view similar to that of FIG. 3 for a variant of the invention.

In a variant embodiment of the invention shown in FIG. 9, the male part 306 comprises a return means 902, in this case a coil spring, which urges the slide 310 into the blocking position. The return means 902 also facilitates the exiting of the slide 310.

In the embodiment of the invention presented here, the return means 902 is accommodated in the chamber bearing the counter-stop 322, and it is constrained between a wall of the chamber and an element of the slide 310, in this case a stud 904.

Although this return means 902 is presented on a particular assembly, it is applicable to the various embodiments presented above.

The cap 312 also comprises a retaining hole 906 which makes it possible to attach the locking means 326 when it is not accommodated in the orifice 324, thus preventing it from being lost and allowing the locking means 326 to be used for pulling on the cap 312.

Although this retaining hole 906 is presented on a particular assembly, it is applicable to the various embodiments presented above.

In the embodiments of FIGS. 3 to 9, the female part 302 is a one-piece part made of a single material, for example made of metal or of a composite material.

Figure 10:
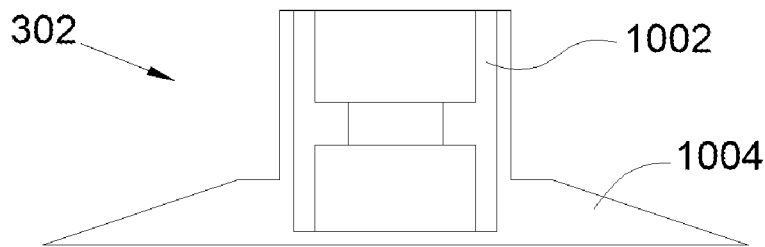
FIG. 10 is a view in section of a female part according to a first variant.
Figure 11:
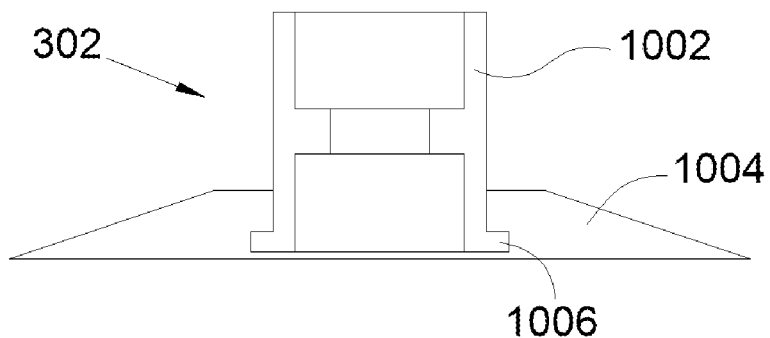
FIG. 11 is a view in section of a female part according to a second variant.

FIG. 10 and FIG. 11 showed two variant embodiments of the female part 302, in which variant embodiments the cylindrical wall 252 and the shoulder 304 are realized by a metal insert 1002, and the base 250 is realized by a pedestal 1004 made of a composite material.

In the embodiment of FIG. 10, the pedestal 1004 is overmolded around the insert 1002 so as to ensure the fastening of the insert 1002.

In the embodiment of FIG. 11, the insert 1002 has a collar 1006 which extends to the exterior of the insert 1002 and which is embedded in the pedestal 1004 so as to ensure the fastening of the insert 1002.

In each of the embodiments described above, the fastening of the base 250 is effected, for example, by adhesive bonding to the composite panel 208.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
  a support panel of an internal fixed structure of a nacelle of a turbofan,
  a thermal protection element in contact with the support panel at a contact surface, and
  a plurality of fastening systems which removably fasten the thermal protection element to the support panel,
  wherein, for each fastening system, the thermal protection element has a hole passing through it,
  wherein each fastening system comprises:
    a female part accommodated in the corresponding hole, and having a base secured to the support panel and a cylindrical wall delimiting a free and open space in a direction away from the support panel, wherein the cylindrical wall has a circular shoulder which protrudes towards the interior of the cylindrical wall, and
    a male part comprising
      a sleeve inserted in the cylindrical wall and pierced with a main bore,
      a slide movable in translation in the main bore, and
      a plurality of balls,
      wherein, for each ball, the sleeve has a secondary bore which is perpendicular to the main bore and which leads, on a first side, into said main bore and, on a second side, to the exterior of the sleeve,
      wherein each ball is placed in the corresponding secondary bore and is movable in translation along said secondary bore between a locking position, in which the ball projects on the second side, and an unlocking position, in which the ball does not project on the second side,
      wherein, for each ball, the slide comprises a cavity having a shape of a half-ball,
      wherein the slide is movable in translation between a blocking position, in which the slide is in a position such that the cavities are not opposite the balls and such that the balls are forced into the locking position, and an unblocking position, in which the slide is in a position such that the cavities are opposite the balls allowing the balls to pass into the unlocking position, and
    wherein the male part comprises a cap which is secured to the sleeve and which bears against a face of the thermal protection element on a side opposite to the contact surface.

2. The assembly according to claim 1,
  wherein a movement from the blocking position to the unblocking position of the slide comprises pressing down the slide in the sleeve,
  wherein the slide bears a stop and the sleeve has a chamber in which the stop moves and a face of which constitutes a counter-stop against which the stop bears in the blocking position, and
  wherein the slide has, in the blocking position, an end which goes beyond the cap and which is passed through by an orifice in which a locking means is inserted.

3. The assembly according to claim 1, wherein, for each female part, the assembly comprises a cylindrical washer which fits tightly on the female part to fill the space between the support panel and the thermal protection element at the hole.

4. The assembly according to claim 1, wherein, for each female part, the assembly comprises a grommet which is positioned along edges of the corresponding hole of the thermal protection element, which fits tightly on the corresponding cylindrical wall and which bears against the base.

5. The assembly according to claim 4, wherein each male part is secured to the thermal protection element.

6. The assembly according to claim 5,
  wherein, for each female part, the assembly comprises a cylindrical washer which fits tightly on the female part so as to fill the space between the support panel and the thermal protection element at the hole,
  wherein the thermal protection element comprises, on its face oriented against the cap, a supporting plate adhesively bonded to said face, and
  wherein the cap is fastened to the grommet and to the supporting plate.

7. The assembly according to claim 5,
  wherein the thermal protection element comprises, on its face oriented against the cap, a supporting plate adhesively bonded to said face, and
  wherein the cap is fastened to the supporting plate.

8. The assembly according to claim 1, wherein the male part comprises a return means which urges the slide into the blocking position.

9. The nacelle of a turbofan, said nacelle comprising an internal fixed structure and an assembly according to claim 1, wherein the support panel is a panel of the internal fixed structure.

10. An aircraft comprising at least one nacelle according to claim 9.

* * * * *